(12) United States Patent
Murai et al.

(10) Patent No.: US 11,077,818 B2
(45) Date of Patent: Aug. 3, 2021

(54) AIRBAG DEVICE

(71) Applicant: TOYODA GOSEI CO., LTD., Kiyosu (JP)

(72) Inventors: Takamitsu Murai, Kiyosu (JP);
Shunsuke Kamei, Kiyosu (JP);
Hisanori Kihara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 38 days.

(21) Appl. No.: 16/654,642

(22) Filed: Oct. 16, 2019

(65) Prior Publication Data
US 2020/0122672 A1  Apr. 23, 2020

(30) Foreign Application Priority Data
Oct. 19, 2018  (JP) .............................. JP2018-197647

(51) Int. Cl.
*B60R 21/215*  (2011.01)
*B60R 21/203*  (2006.01)

(52) U.S. Cl.
CPC .......... *B60R 21/215* (2013.01); *B60R 21/203* (2013.01); *B60R 2021/21537* (2013.01)

(58) Field of Classification Search
CPC ................ B60R 21/215; B60R 21/203; B60R 2021/21537
USPC ....................................................... 280/731
See application file for complete search history.

(56) References Cited

U.S. PATENT DOCUMENTS

| 6,131,943 | A | 10/2000 | Breitweg |
| 6,254,127 | B1 * | 7/2001 | Breed ................. B60N 2/002 280/735 |
| 6,378,894 | B1 | 4/2002 | Trevino et al. |
| 8,465,048 | B2 * | 6/2013 | Hayashi ............. B60R 21/2155 280/728.3 |
| 9,120,453 | B2 * | 9/2015 | Obayashi ............... B62D 7/222 |
| 10,406,975 | B2 * | 9/2019 | Obayashi ............... B62D 7/222 |
| 2014/0210191 | A1 | 7/2014 | Bosch et al. |

(Continued)

FOREIGN PATENT DOCUMENTS

| JP | H11-263183 A | 9/1999 |
| JP | 2001-39254 A | 2/2001 |
| JP | 2010-132013 A | 6/2010 |

(Continued)

*Primary Examiner* — Faye M Fleming
(74) *Attorney, Agent, or Firm* — Posz Law Group, PLC (57) ABSTRACT

An airbag device includes an airbag, an airbag cover which covers the airbag, and a holder which holds the airbag and the airbag cover. The airbag cover includes a door portion which is pushed by the inflating airbag and opened with a hinge portion around a rotation center. A functional component is provided on the door portion and connected to and held by a deformable holding member. The holding member includes a distal side connecting portion connected to the functional component, a proximal side connecting portion connected to a part which can ensure an attachment strength, and a deformation portion which is provided between the distal and proximal side connecting portions and deformed to maintain a connection and holding state of the distal side connecting portion with the functional component and reduce a centrifugal force of the functional component acting on the hinge portion when the airbag is inflated.

7 Claims, 9 Drawing Sheets

(56) References Cited

U.S. PATENT DOCUMENTS

2017/0369022 A1   12/2017   Kanto et al.
2020/0122672 A1    4/2020   Murai et al.

FOREIGN PATENT DOCUMENTS

| | | |
|---|---|---|
| JP | 2016-505453 A | 2/2016 |
| JP | 2017-226348 A | 12/2017 |
| JP | 2020-063017 A | 4/2020 |

\* cited by examiner

AIRBAG DEVICE

CROSS-REFERENCE TO RELATED APPLICATION

This application claims priority from Japanese Patent Application No. 2018-197647, filed on Oct. 19, 2018, the entire subject matter of which is incorporated herein by reference.

TECHNICAL FIELD

The present invention relates to an airbag device which is mounted on a steering wheel or the like, and particularly to an airbag device including a functional component which is provided on a door portion of an airbag cover that is pushed and opened by an inflating airbag.

BACKGROUND ART

A related-art airbag device mounted on a vehicle includes an airbag which is unfolded and inflated from a folded state by flowing inflation gas therein, an airbag cover which covers the folded airbag, and a holder which holds the airbag and the airbag cover (see, for example, JP-A-2017-226348). In this airbag device, the airbag cover includes a door portion which is pushed by the inflating airbag and opened with a hinge portion being used as a rotation center, and an attachment wall portion which is provided around the door portion and is attached to the holder. The door portion is provided with a functional component including a light emitting display device.

In the related-art airbag device, since the functional component is attached to a back surface side of the door portion and rotates integrally with the door portion when the airbag is inflated, a weight of the functional component is applied to the hinge portion of the door portion in addition to a weight of the door portion. Therefore, the hinge portion needs to have sufficient strength to bear a centrifugal force of the door portion and the functional component, so that a reinforcing member needs to be provided. Further, if the weight of the functional component increases, it cannot be dealt with easily.

SUMMARY

Accordingly, the present invention has been made in view of the above circumstances. An aspect of the present invention provides an airbag device which can be arranged easily while reducing reinforcement of a hinge portion of a door portion even if a functional component is provided on the door portion which is pushed and opened by an airbag.

According to an embodiment of the present invention, there is provided an airbag device configured to be mounted on a vehicle. The airbag device includes: an airbag configured to be unfolded and inflated from a folded state by flowing inflation gas therein; an airbag cover configured to cover the folded airbag; and a holder configured to hold the airbag and the airbag cover. The airbag cover includes: a door portion configured to be pushed by the inflating airbag and opened with a hinge portion being used as a rotation center; and an attachment wall portion provided so as to surround a periphery of the door portion and attached to the holder. A functional component is provided on the door portion. The functional component is connected to and held by a deformable holding member. The holding member includes: a distal side connecting portion provided on a distal end portion side thereof and connected to the functional component; a proximal side connecting portion connected to a part which excludes the door portion and the hinge portion and can ensure an attachment strength; and a deformation portion provided between the distal side connecting portion and the proximal side connecting portion and configured to be deformed to maintain a connection and holding state of the distal side connecting portion with the functional component and to reduce a centrifugal force of the functional component acting on the hinge portion when the airbag is inflated.

In the above-described airbag device, the functional component provided on the door portion is connected to and held by the deformable holding member. When the door portion is pushed and opened as the airbag is inflated with the hinge portion being used as the rotation center, the functional component is rotated and moved while the deformation portion of the holding member is deformed to reduce the centrifugal force of the functional component acting on the hinge portion of the door portion.

Therefore, in the above-described airbag device, even if the functional component is provided on the door portion which is pushed and opened by the airbag, reinforcement of the hinge portion of the door portion can be reduced and the airbag device can be arranged easily.

In the above-described airbag device, the proximal side connecting portion of the holding member may be connected to the attachment wall portion of the airbag cover or the holder.

In this configuration, the proximal side connecting portion of the holding member is connected to a constituent member of the airbag device. Therefore, it is possible to efficiently mount the airbag device on the vehicle since there is no connection operation of the proximal side connecting portion to a vehicle body side member as compared to a case where the proximal connecting portion is connected to other vehicle body side members.

In the above-described airbag device, the holding member may be formed of a plastically deformable material or may be formed of a flexible material as long as the functional component is detachably assembled so as to be prevented from being displaced with respect to the door portion.

If the holding member is formed of a plastically deformable material, the functional component can be held stably with shape retainability until the holding member is deformed. Therefore, assembling of the functional component to the door portion can be performed with a simple manner, like fitting operation. On the other hand, if the holding member is formed of a flexible material, attachment to the door portion requires a locking structure that can temporarily hold the functional component. However, since the holding member has flexibility, when the functional component connected to the distal side connecting portion is assembled to the door portion or when the proximal side connecting portion is connected to a predetermined connecting part, the deformation portion is bent freely as compared with the plastically deformable holding member, so that assembly operation and the connection operation can be performed easily.

In the above-described airbag device, the functional component may be a camera that is configured to capture an image of an occupant, which is heavier than another light emitting device or the like. However, the centrifugal force of the camera acting on the hinge portion which is the rotation center when the door portion of the airbag cover is opened can be reduced. Therefore, the camera can be provided on the door portion which is pushed and opened by the airbag without causing any damage to the hinge portion and without any trouble.

In the above-described airbag device, an ornament may be provided on a front surface side of the door portion, and the ornament may include a light transmission part, and a lens portion of the camera may be provided on a back surface side of the light transmission part.

In this configuration, the lens portion of the camera can be hidden by the ornament so as to be inconspicuous. The lens portion is covered by the light transmission part of the ornament, so that there is no problem in capturing an image.

DESCRIPTION OF EMBODIMENTS

Figure 1:
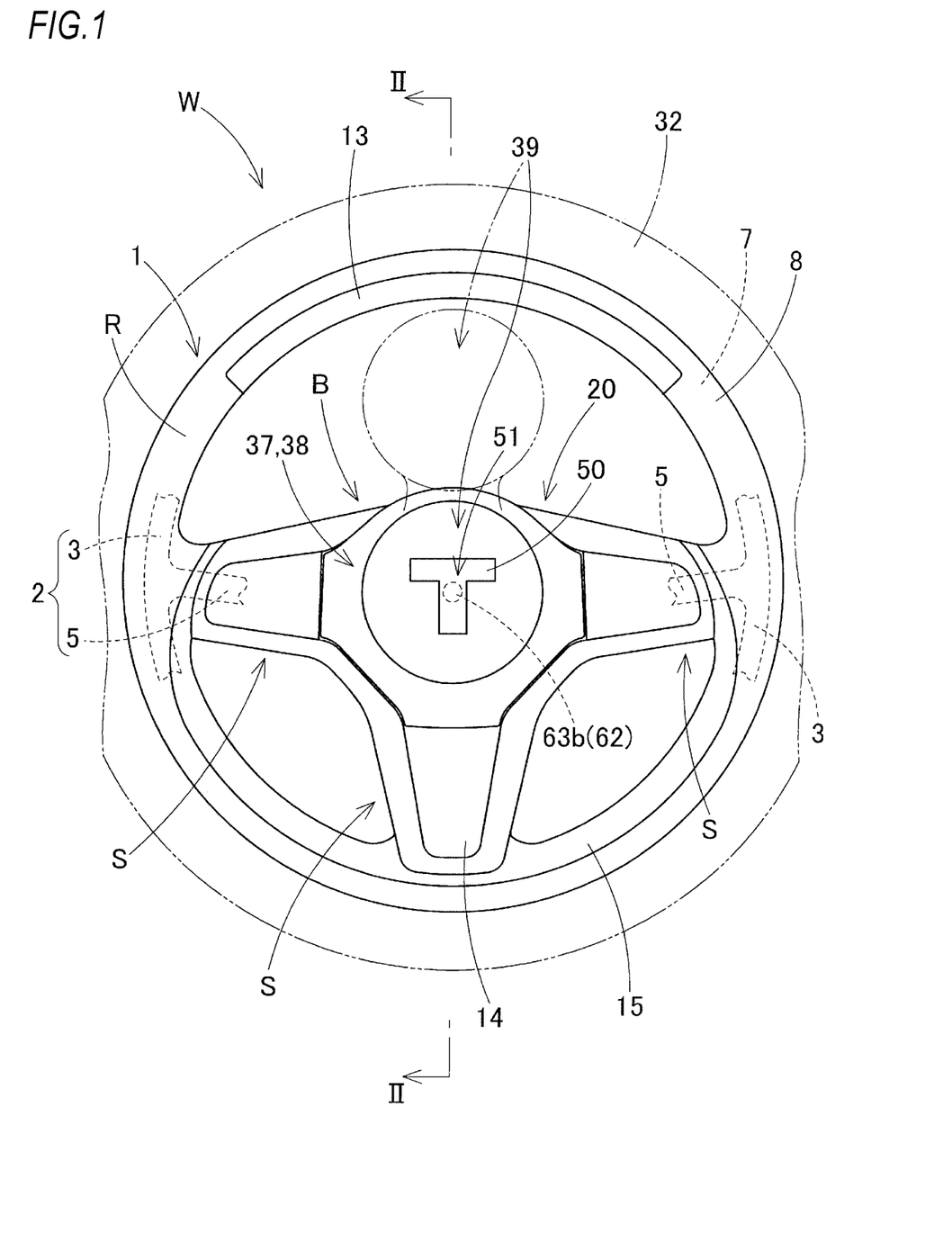
FIG. 1 is a top view of a steering wheel on which an airbag device according to a first embodiment of the present invention is mounted.
Figure 2:
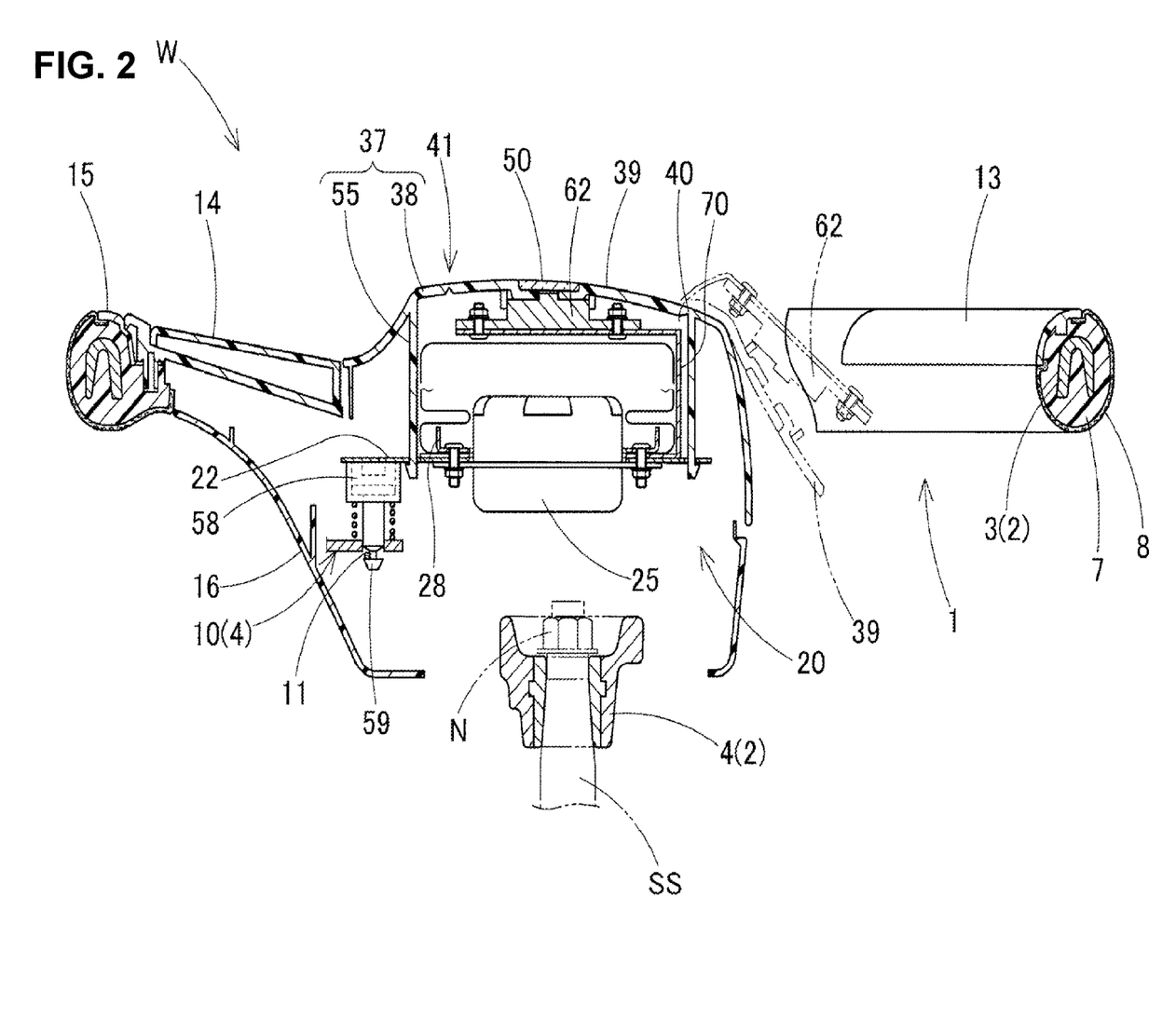
FIG. 2 is a schematic longitudinal sectional view of the steering wheel taken along a II-II part in FIG. 1 according to the first embodiment.

Hereinafter, a first embodiment of the present invention will be described with reference to the drawings, and an airbag device 20 according to the first embodiment is mounted in a steering wheel W which is steered by a driver in a vehicle, as illustrated in FIGS. 1 and 2. As illustrated in FIG. 1, the steering wheel W includes a steering wheel main body 1 including a ring portion R which is gripped at a time of steering, a boss portion B which is provided in a center of the ring portion R, and spoke portions S which connect the ring portion R and the boss portion B, and an airbag device 20 which is provided on an upper part of the boss portion B.

Incidentally, upper-lower direction, left-right direction and front-rear direction in the present specification are based on straight steering of the vehicle when the steering wheel W is fastened and connected to a steering shaft SS (see FIG. 2) of the vehicle by a nut N. The upper-lower direction corresponds to an upper-lower direction along an axial direction of the steering shaft SS, the left-right direction corresponds to a left-right direction of the vehicle orthogonal to the axial direction of the steering shaft SS, and the front-rear direction corresponds to a front-rear direction of the vehicle orthogonal to the axial direction of the steering shaft (see FIG. 1).

The steering wheel main body 1 includes a core metal 2 which is provided so as to connect the ring portion R, the boss portion B and the spoke portion S, and a coating layer 7 which is formed of urethane or the like and is configured to cover the ring portion R and a part of the core metal 2 of the spoke portion S in a vicinity of the ring portion R. The leather 8 is wound around a surface of the coating layer 7. Further, decorative garnishes 13, 15 are provided on an inner peripheral side of a front part and a rear part of the ring portion R.

The core metal 2 includes a ring core metal portion 3 which is provided in the ring portion R, a boss core metal portion 4 which is connected to the boss portion B and is connected to the steering shaft SS, and spoke core metal portions 5 which are provided on the left and right spoke portions S and connects the ring core metal portion 3 and the boss core metal portion 4. In the embodiment, the spoke core metal portion 5 is provided only at parts of the left and right two spoke portions S on a front side, and the spoke portion S on a rear side is provided with a bezel 14 which surrounds a periphery of an airbag cover 37 (described below).

A fixing portion 10 configured to fix an assembly pin 59 of a horn switch body 58 (described below) of the airbag device 20 is provided on a peripheral edge of the boss core metal portion 4 of the core metal 2 (see FIGS. 2 and 3). The fixing portion 10 includes a locking hole 11 which penetrates in a tapered shape that narrows downward and a locking pin (the reference numeral is omitted) which is provided on a lower surface side of the boss core metal portion 4 to lock a distal end of the assembly pin 59. The locking pin is formed of a spring material which can be bent along a lower surface of the boss core metal portion 4 such that the locking pin can be restored.

The steering wheel main body 1 includes a lower cover 16 provided on a lower surface side of the boss portion B (see FIG. 2).

Figure 3:
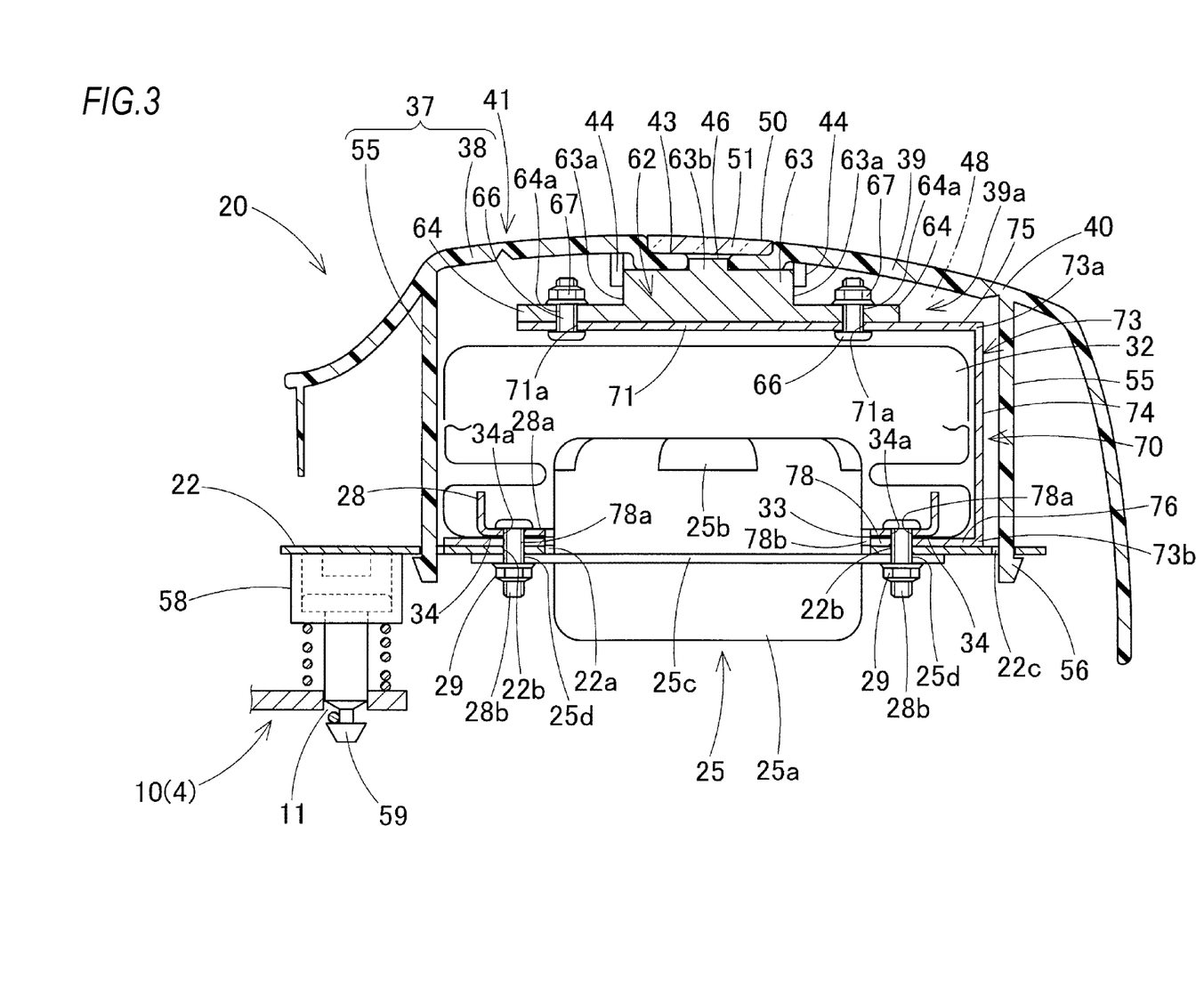
FIG. 3 is a schematic longitudinal sectional view of the airbag device according to the first embodiment.

As illustrated in FIGS. 1 to 3, the airbag device 20 includes an airbag 32 configured to be inflated by inflating inflation gas, an inflator 25 configured to supply the inflation gas to the airbag 32, a synthetic resin airbag cover 37 configured to cover the folded airbag 32 and provided on an upper surface side of the boss portion B, a sheet metal holder 22 configured to hold the airbag 32, the inflator 25 and the airbag cover 37, and a retainer 28. The airbag device 20 according to the embodiment includes a camera 62 configured to capture an image of the driver and provided in the airbag cover 37, and a holding member 70 configured to hold the camera 62.

The airbag 32 includes an inflow opening 33 which is opened in a circular shape so as to allow the inflation gas to flow into a lower side to become a substantially disk shape which has a thickness and approximates to a spherical shape, and four through holes 34*a*, through which bolts 28*b* pass, are formed in a peripheral edge 34 of the inflow opening 33 as fixing members for the retainer 28.

The inflator 25 includes a cylindrical main body portion 25*a* including a plurality of gas discharge ports 25*b* for discharging the inflation gas at an upper part thereof, and a square annular flange portion 25*c* protrudes from an outer peripheral surface of the main body portion 25*a*. The flange portion 25*c* is formed with through holes 25*d*, through which the bolts 28*b* of the retainer 28 pass.

The retainer 28 includes a square annular sheet metal main body 28*a*, and the bolts 28*b* which protrude downward are provided at four corners of the retainer 28. The retainer 28 is provided at the peripheral edge 34 of the inflow opening 33 in the airbag 32, and each bolt 28b passes through the through hole 34a of the airbag 32, a through hole 22b of the holder 22, an attachment hole 78a of the holding member 70, and the through hole 25d of the flange portion 25c of the inflator 25 in order, so that the airbag 32, the holding member 70, and the inflator 25 are attached to the holder 22 by fastening nuts 29 to the bolts 28b.

The holder 22 is formed of a metal plate. A circular insertion hole 22a into which the main body portion 25a of the inflator 25 can be inserted from below is provided at a center of the holder 22, and the through hole 22b, through which the bolt 28b passes, is provided at a peripheral edge of an insertion hole 22a. In addition, locking holes 22c for attachment and fixation of the airbag cover 37 are provided at four locations near an outer peripheral edge of the holder 22. A plurality of horn switch bodies 58 are attached to the lower surface of the holder 22, and the airbag device 20 is attached and fixed to the boss core metal portion 4 of the steering wheel main body 1 using the attachment pin 59 of each of the horn switch bodies 58.

The horn switch body 58 includes a movable side contact point and a fixed side contact point (not illustrated), and is used to activate a horn by contacting the movable side contact point with the fixed side contact point when the airbag device 20 is pushed down.

As illustrated in FIGS. 1 to 4, the airbag cover 37 is formed of a synthetic resin which is an olefin-based thermoplastic elastomer or the like and is provided on the upper surface side of the boss portion B near a center of the steering wheel W. The airbag cover 37 includes a ceiling wall portion 38 which covers an upper side of the airbag 32 that is folded and stored inside the boss portion B, and an attachment wall portion 55 which extends in a substantially cylindrical shape from a lower surface of the ceiling wall portion 38 and covers front, rear, left, and right sides (outer peripheral sides) of the folded airbag 32.

A disk-shaped door portion 39, which is pushed and opened forward by the inflating airbag 32, is provided on the ceiling wall portion 38. The door portion 39 is provided with a hinge portion 40 on a front edge side of the door portion 39 and is provided with a thin-walled designed breakage portion 41 having a substantially arc shape as viewed from above.

A substantially T-shaped ornament 50 formed of a transparent synthetic resin (for example, PC resin, PMMA resin, and PET resin) is fixed to an upper surface side of the door portion 39. The ornament 50 includes a surface subjected to a half mirror process, so that a driver can be visually recognized from an airbag cover 37 side, but appears like a mirror from an outside. That is, the ornament 50 according to the embodiment is a light transmitting part 51 as a whole as viewed from the airbag cover 37 side.

A storage recess 43 for mounting the ornament 50 is provided on the upper surface of the door portion 39, and a through hole 46 for arranging a lens portion 63b of the camera 62 is provided at a center of the storage recess 43. The ornament 50 is fixed to the storage recess 43 by adhesion or the like so as to close the through hole 46. Positioning protrusions 44, 44, which can fit edge portions 63a of a main body portion 63 of the camera 62, protrude from a back surface side of the storage recess 43, that is, on a back surface 39a side of the door portion 39.

Figure 4:
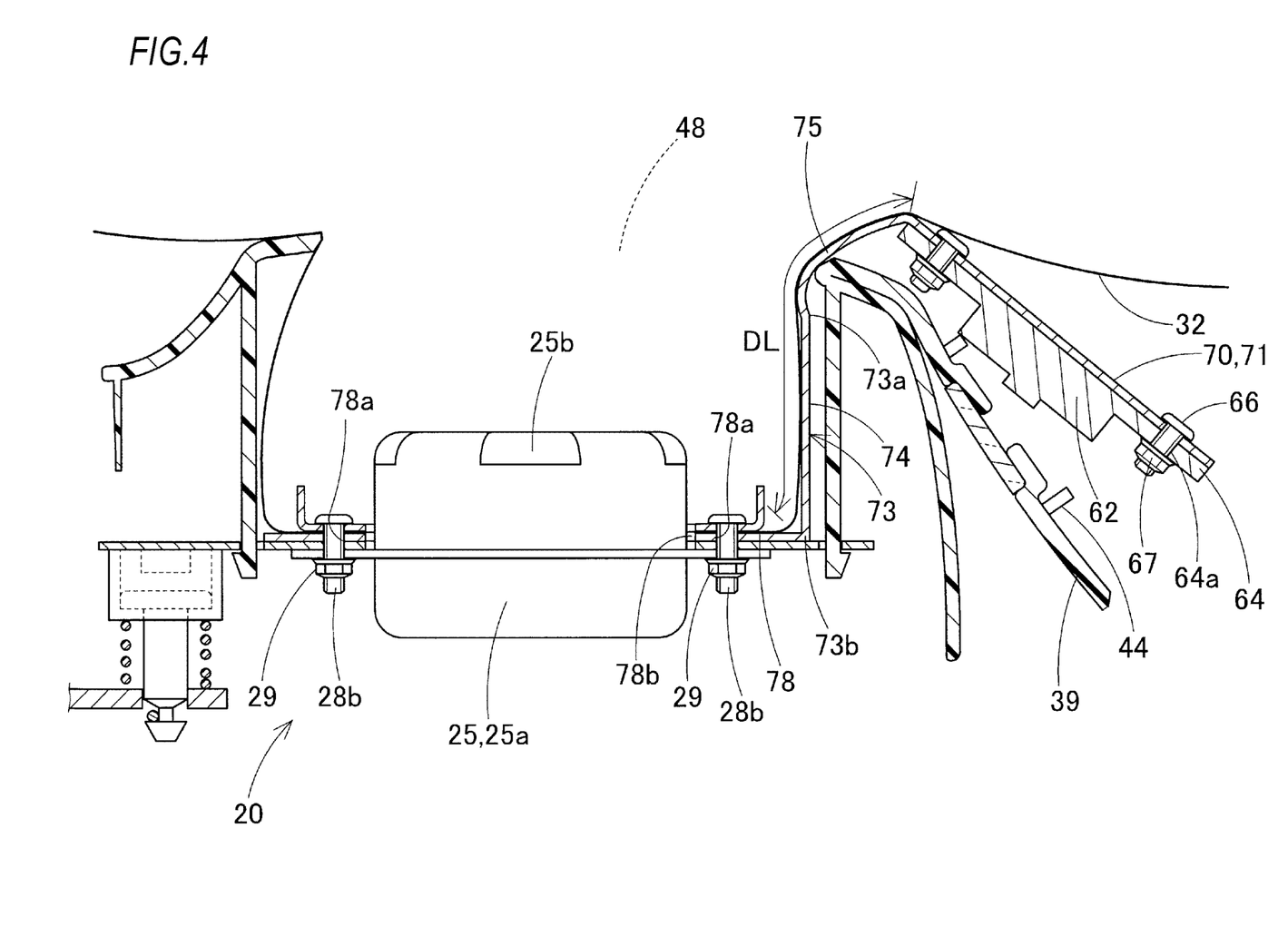
FIG. 4 is a schematic longitudinal sectional view illustrating a door portion which is opened when the airbag device according to the first embodiment is operated.

When the door portion 39 is opened, the ornament 50 rotates integrally with the door portion 39, and then the positioning protrusions 44, 44 on the back surface 39a side of the storage recess 43 are detached from the camera 62.

A plurality of (four in the embodiment) locking leg portions 56 protrude from a lower end of the attachment wall portion 55 of the airbag cover 37. Each of the locking leg portions 56 is inserted into the locking holes 22c of the holder 22 and is attached and fixed to the holder 22.

The camera 62 includes the main body portion 63 in which the lens portion 63b is provided and attachment seats 64 provided on both front and rear sides of the main body portion 63. Through holes 64a, through which bolts 66 pass, are provided in attachment seats 64. The camera 62 is configured to capture an image of a vicinity of a pupil of the driver to output captured image data to a determination unit configured to determine whether the driver is in a drivable state where the steering wheel W can be steered smoothly or in a non-drivable state which is dozing state or the like.

In the first embodiment, the holding member 70 is formed of a metal material which is a plate material, a wire material or the like formed of a plastically deformable steel, an aluminum alloy or the like (in the embodiment, formed of a metal plate) and has a U shape. The holding member 70 includes a distal side connecting portion 71 on a distal end portion side to which the camera 62 is connected so as to connect and hold the camera 62, a proximal side connecting portion 78 which is connected to the holder 22, and a deformation portion 73 which is provided between the distal side connecting portion 71 and the proximal side connecting portion 78. An attachment hole 71a for fixing the attachment seat 64 of the camera 62 by the bolt 66 is passed through the distal side connecting portion 71, and the attachment hole 78a, through which each of the bolts 28b of the retainer 28 passes, is formed in the proximal side connecting portion 78. The proximal side connecting portion 78 is sandwiched between the retainer 28 and the holder 22 and is attached to the holder 22. The proximal side connecting portion 78 also includes insertion holes 78b into which the main body portion 25a of the inflator 25 is inserted.

The deformation portion 73 is plastically deformed to maintain a connection and holding state of the distal side connecting portion 71 and the camera 62 and to reduce a centrifugal force of the camera 62 which is a functional component acting on the hinge portion 40 when the airbag 32 is inflated. The deformation portion 73 includes a main body portion 74 which is provided between an upper bent portion 73a and a lower bent portion 73b, and a distal side extending portion 75 which extends toward a distal side connecting portion 71 side and is near the upper bent portion 73a, and a proximal side extending portion 76 which extends toward a proximal side connecting portion 78 side and is near the lower bent portion 73b. Specifically, the deformation portion 73 is configured such that a length dimension DL from the proximal side connecting portion 78 side to the distal side connecting portion 71 side allows the distal side connecting portion 71 holding the camera 62 to rotate and move without causing a weight of the camera 62 to act on the hinge portion 40 of the door portion 39 even if the distal side connecting portion 71 is pushed by the inflating airbag 32 (see FIG. 4). Then, when the airbag 32 is inflated, the distal side connecting portion 71 holding the camera 62 is pushed by the inflating airbag 32 and is plastically deformed such that the bent portion 73a is expanded, and the distal side extending portion 75 near the bent portion 73a and the main body portion 74 are also plastically deformed. At the same time, the door portion 39 is also pushed by the inflating airbag 32 directly or indirectly with the camera 62 and the distal side connecting portion 71 being interposed, and is opened by breaking the designed breakage portion 41 therearound with the hinge portion 40 being used as a rotation center when the door portion 39 is opened. In the first embodiment, similarly to a positional relationship in which the hinge portion 40 is provided on a front side of the door portion 39, the deformation portion 73 is positioned on a front side of the distal side connecting portion 71.

In the airbag device 20 according to the first embodiment, at a time of assembly, the airbag 32 is folded while the main body 28a of the retainer 28 is placed into the airbag 32 and each of the bolts 28b protrudes out of the airbag 32 using the through hole 34a, and the folded airbag 32 is wrapped with a wrapping material for preventing folding and collapse (not illustrated).

The camera 62 is connected to and held by the holding member 70 by placing the camera 62 on the distal side connecting portion 71 of the holding member 70, passing each of the bolts 66 through the attachment hole 71a of the distal side connecting portion 71 and the through hole 64a of the attachment seat 64 and fastening a nut 67 to each of the bolts 66.

Next, the bent portions 73a, 73b are expanded, and the folded airbag 32 is placed between the distal side connecting portion 71 and the proximal side connecting portion 78 of the holding member 70. Next, the expanded bent portions 73a, 73b are returned while each of the bolts 28b of the retainer 28 is inserted into the respective attachment holes 78a of the proximal side connecting portion 78, so that the folded airbag 32 is provided between the distal side connecting portion 71 and the proximal side connecting portion 78 of the holding member 70 returned to the U shape.

Thereafter, each of the bolts 28b of the retainer 28 passes through the through hole 22b of the holder 22 to which the horn switch body 58 is attached, the main body portion 25a of the inflator 25 is inserted into the insertion hole 22a of the holder 22 from below, and each of the bolts 28b is passed through each through hole 25d of the flange portion 25c of the inflator 25. Then, the nuts 29 are fastened to each of the bolts 28b, so that the holding member 70 holding the airbag 32, the inflator 25, and the camera 62 is attached and fixed to the holder 22.

Thereafter, each of the locking leg portions 56 of the attachment wall portion 55 of the airbag cover 37 is inserted and locked in the respective locking holes 22c of the holder 22 while the positioning protrusion 44 of the airbag cover 37, to which the ornament 50 is attached, is fitted to the edge portion 63a of the main body portion 63 of the camera 62, so that the airbag cover 37 is attached and fixed to the holder 22. Accordingly, the airbag device 20 can be assembled.

Thereafter, the assembly pin 59 of each of the horn switch body 58 of the airbag device 20 are inserted and locked into the locking holes 11 of the respective fixing portions 10 of the steering wheel main body 1 which is fastened to the steering shaft SS, so that the airbag device 20 is attached to the steering wheel main body 1. Accordingly, the airbag device 20 can be mounted on the vehicle together with the steering wheel W.

A lead wire (not illustrated) for outputting the captured image data and inputting power which extends from the camera 62 and a lead wire (not illustrated) for inputting a signal for activating the inflator 25 are connected to a predetermined connector which extends from the steering wheel main body 1. At this time, the lead wire which extends from the camera 62 is connected to the predetermined connector along the holding member 70 so as to be deformed similarly to the holding member 70 when the door portion 39 is opened.

In the airbag device 20 according to the first embodiment before the activation, the camera 62 provided on the back surface 39a side of the door portion 39 captures an image of the vicinity of the pupil of the driver through the light transmission part 51 and the through hole 46 of the ornament 50 in which the lens portion 63b is provided, and outputs the captured image data to a predetermined determination unit. The camera 62 configured to capture an image of the driver is mounted on the boss portion B on a front surface side of the steering wheel W and can capture an image of the driver without being disturbed by the spoke portion S of the steering wheel W or the like, which is suitable for capturing an image of the driver.

As illustrated in FIGS. 3 and 4, when the airbag device 20 is activated, the inflator 25 discharges inflation gas from the gas discharge ports 25b, so that the airbag 32 is inflated, and the door portion 39 of the airbag cover 37 is pushed by the airbag 32 directly or indirectly with the distal side connecting portion 71 of the holding member 70 or the camera 62 being interposed. Accordingly, the door portion 39 is pushed and opened by breaking the designed breakage portion 41 therearound with the hinge portion 40 being used as the rotation center when the door portion 39 is opened, and an airbag expansion opening 48 is opened at the ceiling wall portion 38 of the airbag cover 37. At the same time, the camera 62 provided on the back surface 39a side of the door portion 39 and the distal side connecting portion 71 of the holding member 70 holding the camera 62 are also pushed by the inflating airbag 32, and the bent portion 73a, the distal side extending portion 75, the main body portion 74, and the like of the deformable portion 73 of the holding member 70 are plastically bent and deformed, and are moved rotationally from an area of the airbag expansion opening 48 with a vicinity of the bent portion 73a being used as the rotation center. At this time, the fitting state between the camera 62 and the positioning protrusion 44 of the door portion 39 is released while the camera 62 is held by the distal side connecting portion 71 of the holding member 70 and is moved rotationally without causing a large centrifugal force to act on the hinge portion 40 of the door portion 39. That is, the centrifugal force of the camera 62 acting on the hinge portion 40 itself of the door portion 39 on which the camera 62 that is the functional component is provided can be reduced (in the embodiment, almost no centrifugal force acts). Therefore, the hinge portion 40 only needs to secure a strength of only the door portion 39 provided with the ornament 50 and can be set without considering the weight of the camera 62, so that a wall thickness, an arrangement position, and the like can be set easily.

Accordingly, in the airbag device 20 according to the first embodiment, even if the camera 62, which is the functional component, is provided in the door portion 39 which is pushed and opened by the airbag 32, reinforcement of the hinge portion 40 of the door portion 39 can be reduced, and the airbag device 20 can be arranged easily.

In the first embodiment, the proximal side connecting portion 78 of the holding member 70 is connected to the holder 22.

That is, in the first embodiment, the proximal side connecting portion 78 of the holding member 70 is connected to the holder 22 which is a constituent member of the airbag device 20. Therefore, it is possible to efficiently mount the airbag device 20 on the vehicle since there is no connection operation of the proximal side connecting portion 78 to a vehicle body side member as compared to a case where the proximal side connecting portion 78 is connected to other vehicle body side members.

In the first embodiment, as long as the proximal side connecting portion 78 of the holding member 70 is configured such that the centrifugal force at a time of rotation of the camera 62 which is the functional component may not act greatly on the door portion 39 and the hinge portion 40 of the airbag cover 37, the proximal side connecting portion 78 of the holding member 70 may pass through the holder 22 and may be connected to the boss core metal portion 4 of the core metal 2 of the steering wheel main body 1 or the like.

Figure 5:
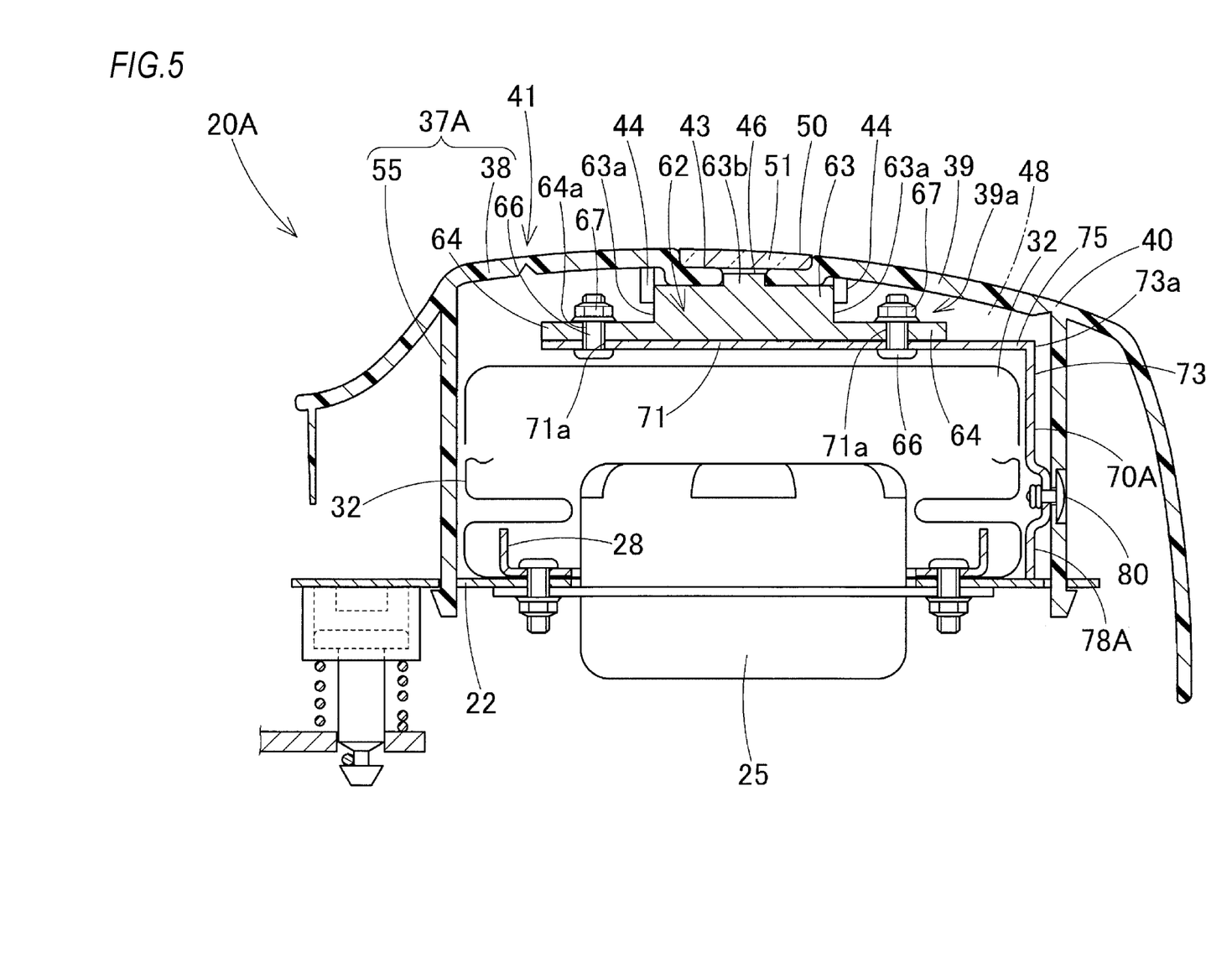
FIG. 5 is a schematic longitudinal sectional view of an airbag device according to a modification of the first embodiment.

As an airbag device 20A illustrated in FIG. 5, a proximal side connecting portion 78A of a holding member 70A may be attached and fixed to the attachment wall portion 55 excluding the door portion 39 and the hinge portion 40 of an airbag cover 37A using a rivet 80, a bolt, or the like. Even in this case, the proximal side connecting portion 78A is connected to the airbag cover 37A which is a constituent member of the airbag device 20A. Therefore, it is possible to efficiently mount the airbag device 20A on the vehicle since there is no connection operation of the proximal side connecting portion 78A to a vehicle body side member as compared to a case where the proximal side connecting portion 78A is connected to other vehicle body side members.

Similarly to the deformation portion 73 according to the first embodiment, the deformation portion 73 of the holding member 70A also has a length which allows the distal side connecting portion 71 holding the camera 62 to rotate and move without causing the weight of the camera 62 to act on the hinge portion 40 of the door portion 39 even if the distal side connecting portion 71 is pushed by the inflating airbag 32.

In the first embodiment, the proximal side connecting portion 78 of the plastically deformable holding member 70 is sandwiched between the retainer 28 and the holder 22 and is connected to the holder 22. However, the proximal side connecting portion 78 may be fixed with bolts, rivets or the like to the holder 22 which is a constituent member of the airbag device 20 at a different position of the holder 22 away from the retainer 28.

In the first embodiment, the camera 62 which is the functional component is detachably assembled to the back surface 39a side of the door portion 39 so as to be prevented from being displaced with respect to the back surface 39a side of the door portion 39 by fitting the edge portions 63a, 63a of the main body portion 63 to the positioning protrusions 44. The holding member 70 is formed of a plastically deformable material.

Therefore, in the first embodiment, the camera 62 which is the functional component can be held stably with shape retainability until the holding member 70 is deformed. Therefore, assembling of the camera 62 to the back surface 39a side of the door portion 39 can be performed with a simple manner like a fitting operation such that the camera 62 can be detached easily.

Figure 6:
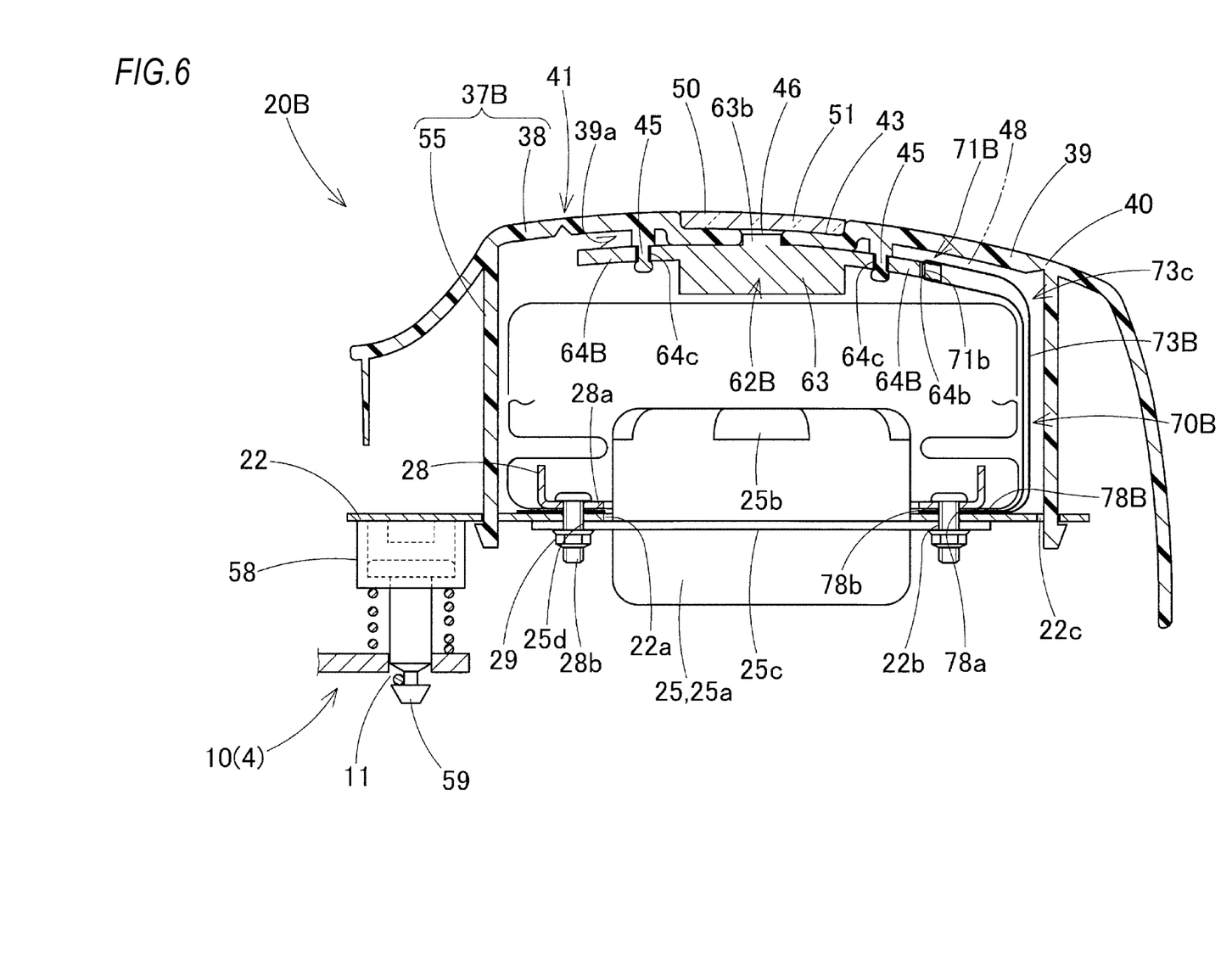
FIG. 6 is a schematic longitudinal sectional view of an airbag device according to a second embodiment of the present invention.
Figure 7:
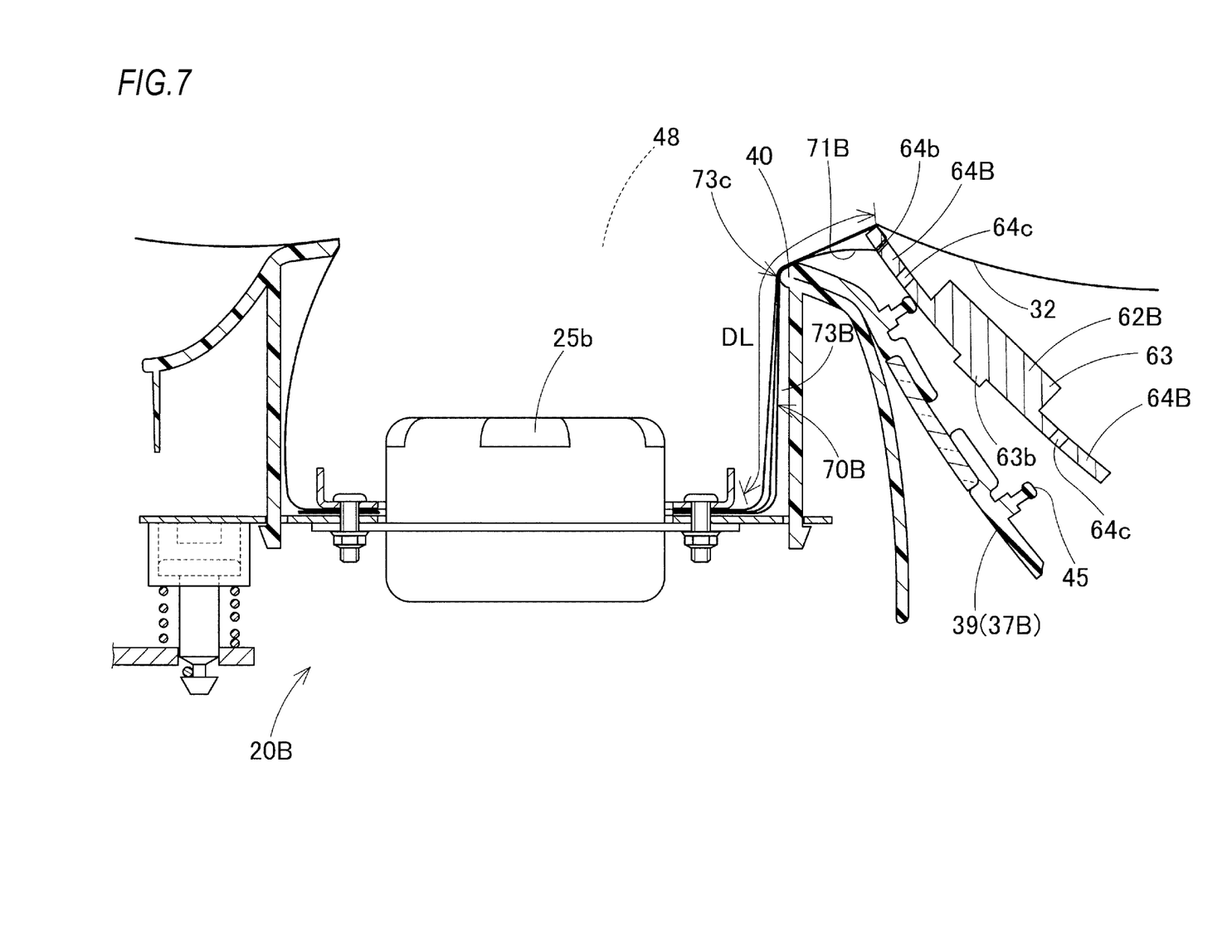
FIG. 7 is a schematic longitudinal sectional view illustrating the door portion which is opened when the airbag device according to the second embodiment is operated.

If this fact is not considered, as the airbag device 20B according to a second embodiment illustrated in FIGS. 6 and 7, the holding member 70B may be formed of a belt material, a string material, a wire material, or the like formed of flexible cloth, resin, rubber, or the like. In the second embodiment, a holding member 70B includes a folded side obtained by folding a belt material formed of a cloth material in two as a distal side connecting portion 71B, and a camera 61B, which is a functional component, is held by inserting the belt material into an insertion hole 64b formed in an attachment seat 64B of the camera 61B and folding back the belt material. When bolts 28b of the retainer 28 is fastened to the holder 22 by fastening the nut 29, a proximal side connecting portion 78B is sandwiched between the retainer 28 and the holder 22 and is attached and fixed to the holder 22. Similarly to the proximal side connection portion 78 of the holding member 70, the proximal side connection portion 78B includes the attachment hole 78a through which each of the bolts 28b is inserted and the insertion holes 78b into which the main body portion 25a of the inflator 25 is inserted.

In the holding member 70B, similar to the holding member 70 according to the first embodiment, a deformation portion 73B is provided between the distal side connecting portion 71B and the proximal side connecting portion 78B. The deformation portion 73B is configured such that the length dimension DL from a proximal side connecting portion 78B side to a distal side connecting portion 71B side allows the distal side connecting portion 71B holding a camera 62B to rotate and move without causing a weight of the camera 62B to act on the hinge portion 40 of the door portion 39 even if the distal side connecting portion 71B is pushed by the inflating airbag 32 (see FIG. 7).

In terms of the arrangement of the camera 62B, a plurality of locking protrusions 45 protrude from the rear surface 39a side of the storage recess 43 in which the ornament 50 in the door portion 39 of an airbag cover 37B is provided. Each of locking protrusions 45 is inserted and locked in locking holes 64c formed in the attachment seat 64 of the camera 62B, so that the camera 62B is assembled to the back surface 39a side of the door portion 39 so as to be prevented from displacement.

In the airbag device 20B according to the second embodiment, the holder 22, the inflator 25, the retainer 28, and the airbag 32 are similar to those according to the first embodiment. The airbag cover 37B differs from the airbag cover 37 according to the first embodiment only in that the airbag cover 37B further includes the locking protrusions 45. Similar to the airbag cover 37 according to the first embodiment, the airbag cover 37B includes the door portion 39, which is pushed by the inflating airbag 32 and is opened by breaking the designed breakage portion 41 therearound with the hinge portion 40 being used as the rotation center, in the ceiling wall portion 38, and the attachment wall 55 extending downward from a periphery of the door portion 39 is attached and fixed to the holder 22 by inserting and locking the locking leg portions 56 at a lower end of the attachment wall 55 into the locking holes 22c of the holder 22.

In the airbag device 20B before the activation, the camera 62B provided on the door portion 39 captures an image of the vicinity of the pupil of the driver through the light transmission part 51 and the through hole 46 of the ornament 50 in which the lens portion 63b is provided, and outputs the captured image data to a predetermined determination unit. When the airbag device 20B is activated, the inflator 25 discharges inflation gas from the gas discharge ports 25b, so that the airbag 32 is inflated, and the door portion 39 of the airbag cover 37B is pushed by the airbag 32 directly or indirectly with the distal side connecting portion 71B of the holding member 70B or the camera 62B being interposed. Therefore, the door portion 39 is pushed and opened by breaking the designed breakage portion 41 therearound with the hinge portion 40 being used as the rotation center when the door portion 39 is opened, and an airbag expansion opening 48 is opened at the ceiling wall portion 38 of the airbag cover 37B. At the same time, the camera 62B provided on the door portion 39 and the distal side connecting portion 71B of the holding member 70B holding the camera 62B are also pushed by the inflating airbag 32, and a vicinity of the upper portion 73c contacting the hinge portion 40 in the deformation portion 73B of the distal side connecting portion 71B and the proximal side connecting portion 78B in the holding member 70B is bent greatly, so that the camera 62B and the distal side connecting portion 71B are moved rotationally from the area of the airbag expansion opening 48 with the vicinity of the upper portion 73c of the deformation portion 73B being used as the rotation center. At this time, the camera 62B is held by the distal side connecting portion 71B of the holding member 70B while the locking protrusions 45 of the door portion 39 are removed from each of the locking holes 64c to release an assembled state with the door portion 39 and the centrifugal force acting on the hinge portion 40 of the door portion 39 is reduced, and is moved rotationally. That is, the centrifugal force of the camera 62B is caused not to greatly act on the hinge portion 40 itself of the door portion 39 in which the camera 62B that is a functional component is provided. Therefore, the hinge portion 40 only needs to secure a strength of only the door portion 39 provided with the ornament 50, and can be set without considering the weight of the camera 62B, so that a wall thickness, an arrangement position, and the like can be set easily.

Therefore, in the airbag device 20B according to the second embodiment, even if the camera 62B, which is the functional component, is provided in the door portion 39 which is pushed and opened by the airbag 32, reinforcement of the hinge portion 40 of the door portion 39 can be reduced and the airbag device 20B can be arranged easily.

In the second embodiment, the proximal side connecting portion 78B of the holding member 70B is connected to the holder 22. However, the centrifugal force at a time of rotation of the camera 62B which is the functional component may not greatly act on the door portion 39 and the hinge portion 40 of the airbag cover 37B. Therefore, the proximal side connecting portion 78B of the holding member 70B may pass through the holder 22 and may be connected to the boss core metal portion 4 of the core metal 2 of the steering wheel main body 1 or the like.

Figure 8:
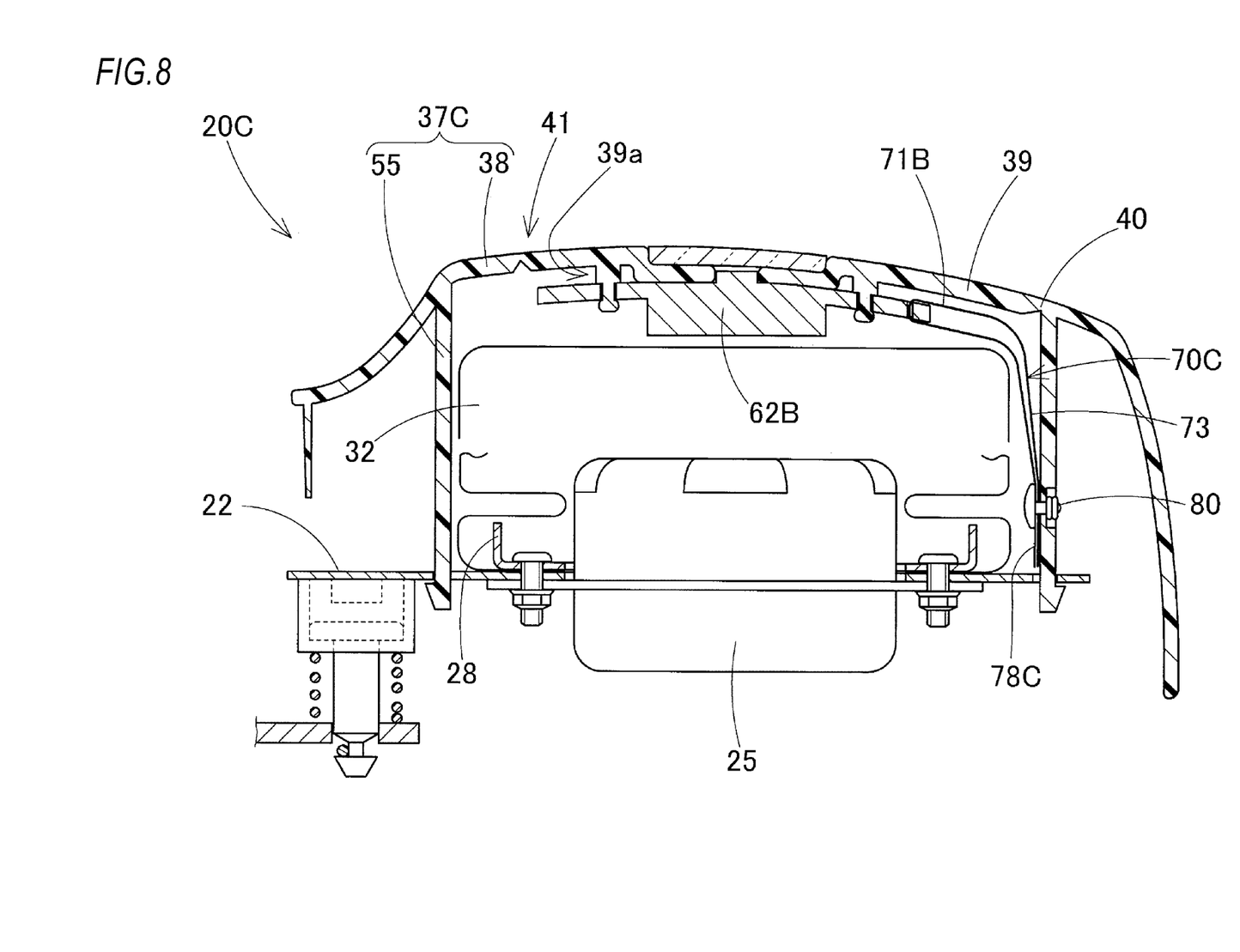
FIG. 8 is a schematic longitudinal sectional view of an airbag device according to a modification of the second embodiment.

As an airbag device 20C illustrated in FIG. 8, a proximal side connecting portion 78C of a holding member 70C may be attached and fixed to the attachment wall portion 55 excluding the door portion 39 and the hinge portion 40 of an airbag cover 37C using the rivet 80, a bolt, or the like. Even in this case, the proximal side connecting portion 78C is connected to the airbag cover 37C which is a constituent member of the airbag device 20C. Therefore, it is possible to efficiently mount the airbag device 20C on the vehicle since there is no connection operation of the proximal side connecting portion 78C to a vehicle body side member as compared to a case where the proximal connecting portion 78C is connected to other vehicle body side members.

As in the second embodiment, in the holding member 70B having flexibility as in the second embodiment, even if the proximal side connecting portion 78B is not sandwiched between the retainer 28 and the holder 22 and is not connected to the holder 22, the proximal side connecting portion 78B may be fixed with bolts, rivets or the like to the holder 22 which is a constituent member of the airbag device 20B at a different position of the holder 22 away from the retainer 28.

In the second embodiment, the camera 62B which is the functional component is detachably assembled to the back surface 39a side of the door portion 39 so as to be prevented from being displaced with respect to the rear surface 39a side of the door portion 39 by inserting the locking protrusions 45 extending from the door portion 39 side into the locking holes 64c and locking the locking protrusions 45 by the attachment seat 64B. The holding member 70B is formed of a flexible material.

Therefore, in the second embodiment, attachment to the back surface 39a side of the door portion 39 requires a locking structure that can temporarily holds the camera 62B. However, since the holding member 70B has flexibility, when the camera 62B which is the functional component connected to the distal side connecting portion 71B is assembled to the back surface 39a side of the door portion 39 or when the proximal side connecting portion 78B is connected to a predetermined connecting part (the bolts 28b fastened to the holder 22), the deformation portion 73B is bent freely as compared with the plastically deformable holding member 70 and assembly operation and the connection operation can be performed easily.

That is, in the second embodiment, each of the bolts 28b of the retainer 28 protruding from the folded airbag 32 is inserted into the attachment hole 78a of the proximal side connecting portion 78B, so that the holding member 70B holding the camera 62B is locked to each of the bolts 28b. At this time, the deformation portion 73B can be bent freely, and lock operation before the connection operation to the holder 22 of the proximal side connecting portion 78B can be performed easily. Thereafter, each of the bolts 28b passes through the through hole 22b of the holder 22, the main body portion 25a of the inflator 25 is inserted into the insertion hole 22a from below the holder 22, and each of the bolts 28b is passed through the through holes 25d of the flange portion 25c of the inflator 25. Then, a nut 29 is fastened to each of the bolts 28b. Next, the locking protrusions 45 on the back surface 39a side of the door portion 39 of the airbag cover 37B to which the ornament 50 is attached are inserted and locked in the locking holes 64c of the camera 62B, so that the camera 62B is assembled to the back surface 39a side of the door portion 39. Also at this time, the deformation portion 73B can be bent freely and the camera 62B can be assembled to the back surface side of the door portion 39, so that the assembly operation of the camera 62B can be performed easily. Thereafter, each of the locking leg portions 56 of the airbag cover 37B is inserted and locked in the locking holes 22c of the holder 22, so that the airbag cover 37B is attached and fixed to the holder 22. Accordingly, the airbag device 20B according to the second embodiment can be assembled.

Figure 9:
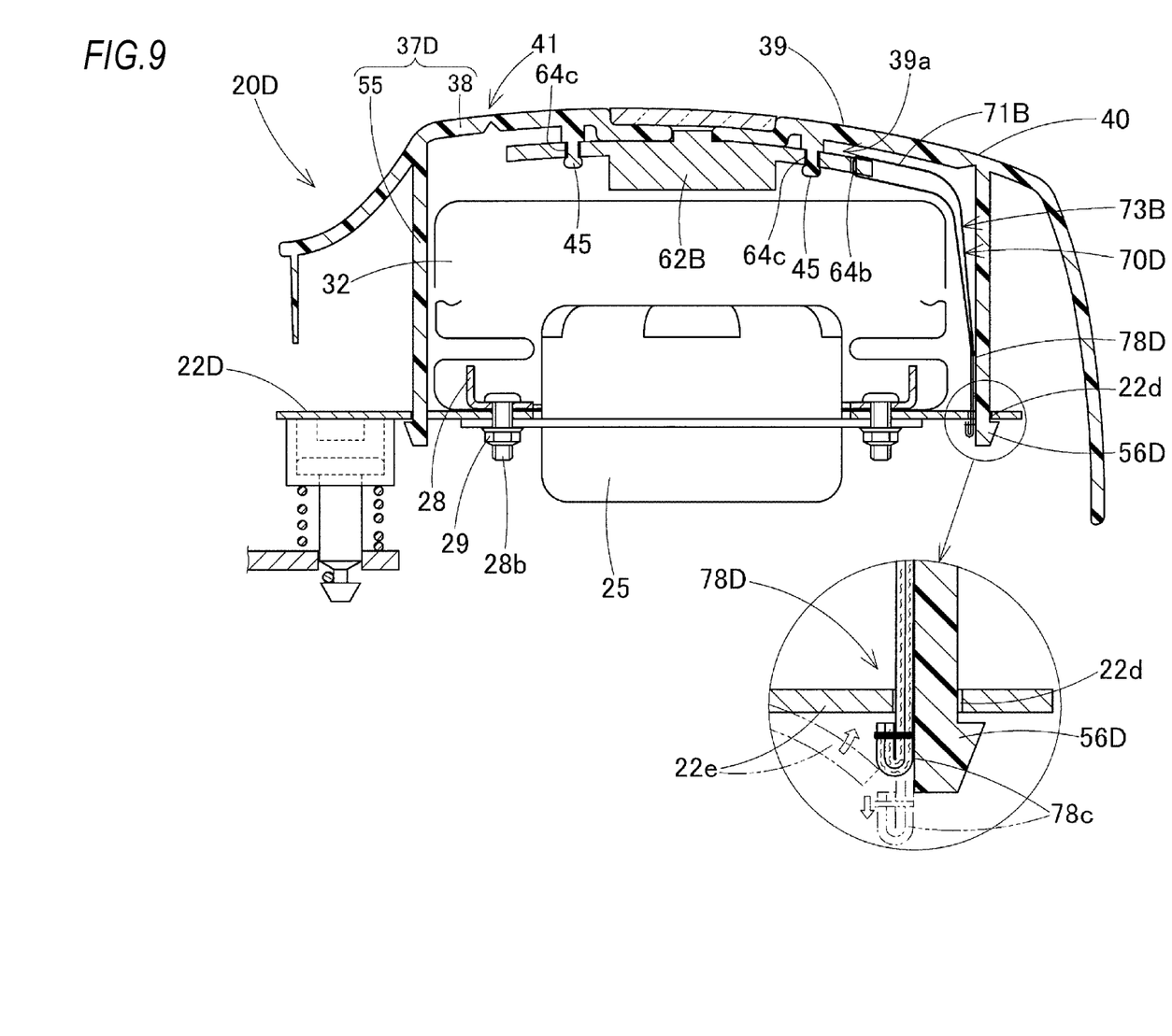
FIG. 9 is a schematic longitudinal sectional view of an airbag device according to another modification of the second embodiment.

When a holding member 70D having flexibility is used, as in an airbag device 20D illustrated in FIG. 9, a proximal side connecting portion 78D of the holding member 70D may be connected to a holder 22D which is a constituent member of the airbag device 20D. In the airbag device 20D, the camera 62B is connected to the distal side connecting portion 71B of the holding member 70D by previously winding distal side connecting portion 71B around the insertion hole 64b of the camera 62B. The locking protrusions 45 are inserted and locked in the locking holes 64c, and the camera 62B is assembled to the back surface 39a side of the door portion 39 of an airbag cover 37D. Then, when the airbag cover 37D is attached by inserting a locking leg portion 56D of the airbag cover 37D into the locking hole 22d with respect to the holder 22D to which the airbag 32 and the inflator 25 are attached using the bolts 28b of the retainer 28 and the nuts 29, a locking head portion 78c of the proximal side connecting portion 78D is also inserted into the locking hole 22d, and the proximal side connecting portion 78D is connected and fixed to the holder 22D. Even in this case, the holding member 70D is formed of a material which is a flexible belt material or the like, and the connecting operation of the holding member 70D to the holder 22D can be performed easily. In order to increase a locking force at the locking hole 22d, a tongue piece 22e which is bending deformable is provided at a peripheral edge of the locking hole 22d so as to narrow an opening of the locking hole 22d after the locking leg portion 56D and the locking head portion 78c are inserted.

The holding member 70B, 70C, 70D having flexibility can be easily bent and connected even if the holding member 70B, 70C, 70D is connected to a vehicle body side member other than the constituent member of the airbag device 20B, 20C, 20D, for example, to the core metal 2 of the steering wheel main body 1.

In the holding member 70, 70B according to the first embodiment and the second embodiment, similar to a positional relationship between the door portion 39 and the hinge portion 40 of the airbag cover 37, the deformation portion 73, 73B extends from the distal side connecting portion 71, 71B to below at front side. However, if the weight of the camera 62, 62B is not caused to act on the hinge portion 40 greatly when the deformation portion 73, 73B is moved with the inflation of the airbag 32, the deformation portion 73, 73B may be extended from the distal side connection portion 71, 71B at a left side, a right side, or a rear side, which is different from the positional relationship between the door portion 39 and the hinge portion 40 of the airbag cover 37.

In the airbag device 20, 20B according to the first embodiment and the second embodiment, the functional component is the camera 62, 62B configured to capture an image of the driver which is an occupant and is heavier than another functional component which is a light emitting device or the like. However, the centrifugal force of the camera 62, 62B is caused not to greatly act on the hinge portion 40 which is the rotation center when the door portion 39 is opened, so that the camera 62, 62B can be provided on the back surface side 39a of the door portion 39 which is pushed and opened by the airbag 32 without causing any damage to the hinge portion 40 and without any trouble.

As the functional component, a light emitting device including a liquid crystal panel and the like may be used instead of the camera. The light emitting device may be connected to and held by the holding member 70, 70B and may be provided on the back surface side of the door portion which is opened when the airbag in the airbag cover is inflated.

In the first embodiment and the second embodiment, when the camera 62, 62B is provided on the back surface 39a side of the door portion 39, the ornament 50 is provided on a front surface side of the door portion 39 and includes the light transmission part 51, and the lens portion 63b of the camera 62, 62B is provided on a back surface side of the light transmission part 51.

Therefore, the lens portion 63b of the camera 62, 62B can be hidden by the ornament 50 so as to be inconspicuous, so that an appearance can be improved. The lens portion 63b is covered by the light transmission part 51 of the ornament 50, so that there is no problem in capturing an image.

In particular, the ornament 50 according to the first embodiment and the second embodiment is subjected to a half mirror process, so that it is more difficult to see the lens portion 63b of the camera 62, 62B, and the camera 62, 62B is caused to be inconspicuous to the driver.

When the camera 62, 62B is provided on the back surface 39a side of the door portion 39, the through hole 46 may be opened without providing the ornament 50. Alternatively, instead of the ornament 50, a transparent or colored transparent protective plate may be provided at the through hole 46.

When the functional component which is the camera 62 or the like is provided on the door portion 39, as in the first embodiment and the second embodiment, the functional component may be provided not only on the rear surface 39a side of the door portion 39 but also on the front surface side of the door portion 39. At this time, the functional component can be held by a holding member provided on a front surface side of the airbag cover or on a holding member which passes through the airbag cover such that the centrifugal force of the functional component generated at a time of the inflation of the airbag is caused not to greatly act on the hinge portion 40 of the door portion 39.

A case where the airbag device 20, 20B according to the first embodiment and the second embodiment is mounted in the boss portion B near the center of the ring portion R gripped at the time of steering in the steering wheel W is exemplified. However, the present invention can be applied if the functional component which is the camera or the like is provided on the door portion of the airbag cover covering the airbag of the airbag device. For example, the present invention can also be applied when the light emitting device or the like is provided as the functional component on the door portion of the airbag cover of a passenger seat airbag device.

The invention claimed is:

1. An airbag device configured to be mounted on a vehicle, the airbag device comprising:
    an airbag configured to be unfolded and inflated from a folded state by flowing inflation gas therein;
    an airbag cover configured to cover the folded airbag; and
    a holder configured to hold the airbag and the airbag cover,
    wherein the airbag cover includes:
        a door portion configured to be pushed by the inflating airbag and opened with a hinge portion being used as a rotation center; and
        an attachment wall portion provided so as to surround a periphery of the door portion and attached to the holder,
    wherein a functional component is provided on the door portion,
    wherein the functional component is connected to and held by a deformable holding member, and
    wherein the holding member includes:
        a distal side connecting portion provided on a distal end portion side thereof and connected to the functional component;
        a proximal side connecting portion connected to a part which excludes the door portion and the hinge portion and can ensure an attachment strength; and
        a deformation portion provided between the distal side connecting portion and the proximal side connecting portion and configured to be deformed to maintain a connection and holding state of the distal side connecting portion with the functional component and to reduce a centrifugal force of the functional component acting on the hinge portion when the airbag is inflated.

2. The airbag device according to claim 1,
    wherein the proximal side connecting portion of the holding member is connected to the attachment wall portion of the airbag cover or the holder.

3. The airbag device according to claim 2,
wherein the functional component is detachably assembled so as to be prevented from being displaced with respect to the door portion, and
wherein the holding member is formed of a plastically deformable material.

4. The airbag device according to claim 2,
wherein the functional component is detachably assembled so as to be prevented from being displaced with respect to the door portion, and
wherein the holding member is formed of a flexible material.

5. The airbag device according to claim 1,
wherein the functional component is a camera configured to capture an image of an occupant.

6. The airbag device according to claim 5,
wherein an ornament is provided on a front surface side of the door portion, and
wherein the ornament includes a light transmission part, and a lens portion of the camera is provided on a back surface side of the light transmission part.

7. The airbag device according to claim 1,
wherein the airbag device is configured to be mounted in a boss portion near a center of a ring portion gripped at a time of steering in a steering wheel.

\* \* \* \* \*